Patented Aug. 18, 1953

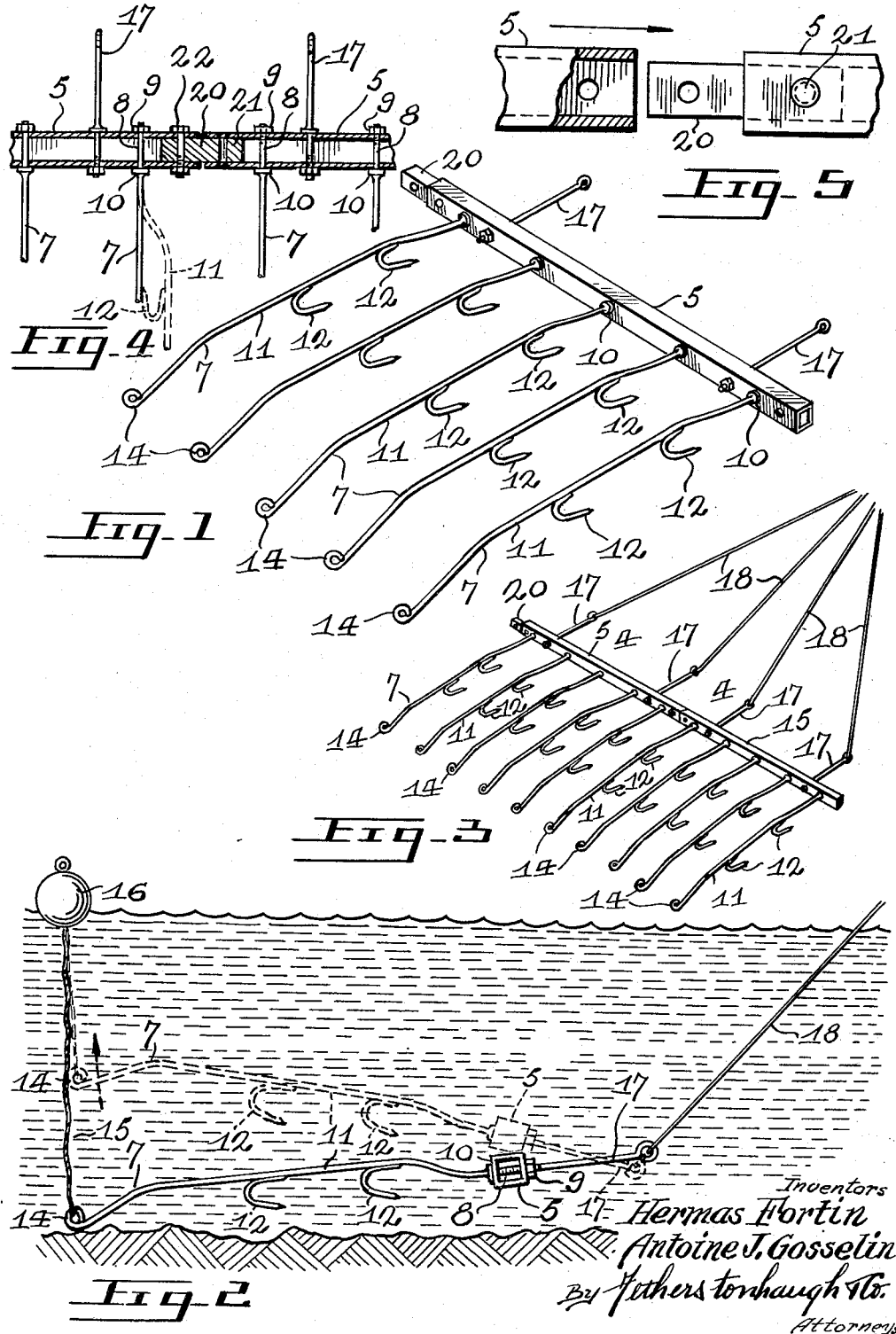

2,649,327

UNITED STATES PATENT OFFICE 2,649,327

DRAG HOOK

Hermas Fortin, Hemmingford, and Antoine J. Gosselin, Ste. Blaise, Quebec, Canada Application September 28, 1950, Serial No. 187,274

4 Claims. (Cl. 294—66)

This invention relates to improvements in drag hooks or grapples for recovering bodies of persons who have been drowned.

One of the primary objects of the invention is to provide a demountable apparatus which is relatively light in weight for easy transportation.

Another object is to provide an apparatus which will ride over a lake or river bed in such a manner as to pick up the body of a drowned person but at the same time pass over smaller objects on the river bed, such as rocks, logs and the like.

A further object of this invention is to provide an apparatus of the character described with means for facilitating the removal of the apparatus from objects on the lake or river bed with which it has become ensnared.

A still further object is to provide such an apparatus with means for readily attaching same to one or more similar apparatus to form a gang drag-hook or grapple device.

The above and other objects and characteristic features of this invention will be more readily understood from the following detailed description taken in connection with the accompanying drawings, in which—

Fig. 1 is a perspective view of an apparatus embodying our invention.

Fig. 2 is a side view of the apparatus shown in Fig. 1 as it would appear in the water.

Fig. 3 is a perspective view showing two such apparatus united to form a gang assembly.

Fig. 4 is a horizontal sectional view (enlarged) taken along the line 4—4 of Fig. 3.

Fig. 5 is an enlarged detail view of the interfitting members of adjacent drag hook frames.

Referring more particularly to the drawings, 5 designates a hollow supporting frame having a series of spaced openings through which hook-carrying bars 7 are inserted in parallel relation to each other. One end of each hook-carrying bar 7 is provided with a threaded shank 8 which is inserted through an opening in the frame and secured in place by a nut 9 screw threaded on the shank 8 of bar 7. A collar 10 at the inner end of the threaded section of bar 7 bears against one surface of frame 5 when nut 9 is screwed against the other surface of the frame to hold the bar in any desired position.

Bar 7 is substantially bow-shaped intermediate its ends, as indicated at 11 and is provided with a plurality of hooks 12 suitably spaced along the inner side of the bowed section so that their prongs, which are directed toward the supporting frame 5, lie substantially along a plane between the opposing ends of the bar. The ends of bars 7 remote from the shank are curved upwardly to provide a runner-like member 14 which rides over the bed of a river or lake, as clearly shown in Fig. 2. The runner-like member 14 may be bent in the form of an eyelet or may project rearwardly. It is desirable, however, to have a runner of eyelet formation for the centre bar 7 so that the rope 15 of a float 16 may be secured thereto. The drawings illustrate the eyelet formation, thus rendering the bars interchangeable.

The frame 5 is also provided with suitably secured detachable tow rods 17 to which drag lines 18 are connected.

In operation the runner member 14 of the drag hook apparatus is drawn along the river or lake bed with the hooks 12 projecting forwardly and downwardly. The hooks 12 are raised slightly above the bed by reason of the bow-shaped central section of the bars to clear any small objects which may be on the bed but are low enough, however, to engage with such larger objects as the body of a drowned person. The float 16 which is attached by rope 15 to the eyelet of the central hook-carrying bar 7 normally rides out on top of the water behind the apparatus. If the hooks 12 happen to be snagged in objects such as roots on the lake or river bed, the apparatus may be towed in reverse direction and raised, if necessary, by manipulation of the float to free the apparatus.

In order to provide a gang assembly of drag hooks one end of the frame of each individual assembly is provided with a shank 20 held in place by a rivet or other suitable means 21. The shank is received in the adjacent end of a second frame as shown in Fig. 4 and secured therein by bolt 22. Additional assemblies may be added in like manner as required.

Each drag hook apparatus may be dismantled to facilitate transportation by removal of the shanks of the bars 7 and tow rods 17. They are also conveniently transportable in their assembled condition. To facilitate transportation of the assembly without dismantling, each hook-carrying bar may be turned on its side, as indicated by dotted lines in Fig. 4, by first loosening nut 9 and then tightening the latter to clamp the bar in its new position.

We claim:

1. A drag hook assembly for recovering drowned bodies and the like, comprising a towing medium, a rigid frame secured to said towing medium, and a plurality of spaced parallel rigid hook-carrying bars having one end secured to said frame to extend from one side thereof, each of said bars being curved in its longitudinal direction to provide a bow-shaped section intermediate the ends of said bar, said bow-shaped section being disposed to overlie a plane extending between the opposite ends of said bar, and a plurality of pronged hooks spaced along the under side of said bow-shaped section and rigidly secured thereto with their prongs directed toward said frame so as to lie substantially within the said plane extending between the opposite end of said bar.

2. A drag hook assembly for recovering drowned bodies and the like, comprising a towing medium, a rigid frame secured to said towing medium, and a plurality of spaced parallel, rigid hook-carrying bars having one end secured to said frame to extend from one side thereof, each of said bars being curved in its longitudinal direction to provide a bow-shaped section intermediate the ends of said bar, said bow-shaped section being disposed to overlie a plane extending between the opposite ends of said bar, and a plurality of pronged hooks spaced along the under side of said bow-shaped section, the end of each of said bars remote from the frame being rearwardly and upwardly curved to provide a rigid runner-like supporting member to facilitate gliding of said assembly.

3. A drag hook assembly as set forth in claim 2, including a fastening element carried by at least one of said runner members and means anchored to said fastening element for manipulating said assembly in a direction other than that imparted by said towing medium.

4. A drag hook assembly for recovering drowned bodies and the like, comprising a towing medium, a rigid frame secured to said towing medium, and a plurality of spaced, parallel, rigid hook-carrying bars having one end secured to said frame to extend from one side thereof, each of said bars being curved in its longitudinal direction to provide a bow-shaped section intermediate the ends of said bar, said bow-shaped section being disposed to overlie a plane extending between the opposite ends of said bar, and a plurality of pronged hooks spaced along the under side of said bow-shaped section, the end of each of said bars remote from the frame being rearwardly and upwardly curved to provide a rigid runner-like supporting member, at least one of said supporting members further shaped to provide an eyelet, and a float member secured thereto for manipulating said assembly in a direction other than that imparted by said towing medium.

HERMAS FORTIN.
ANTOINE J. GOSSELIN.

References Cited in the file of this patent
UNITED STATES PATENTS

| Number | Name | Date |
|---|---|---|
| 873,579 | Munn | Dec. 10, 1907 |
| 946,798 | Franz | Jan. 18, 1910 |
| 1,340,313 | Zipp | May 18, 1920 |
| 1,779,605 | Koerber | Oct. 28, 1930 |
| 2,077,630 | Lane | Apr. 20, 1937 |
| 2,277,545 | Gatley | Mar. 24, 1942 |
| 2,579,864 | Rooker | Dec. 25, 1951 |